(12) United States Patent
Ramirez Llanos et al.

(10) Patent No.: US 11,676,300 B2
(45) Date of Patent: Jun. 13, 2023

(54) METHOD FOR REAL-TIME TOW BALL DETECTION

(71) Applicant: Continental Automotive Systems, Inc., Auburn Hills, MI (US)

(72) Inventors: Eduardo Jose Ramirez Llanos, Auburn Hills, MI (US); Xin Yu, Rochester Hills, MI (US); Matthew Berkemeier, Beverly Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 75 days.

(21) Appl. No.: 17/116,628

(22) Filed: Dec. 9, 2020

(65) Prior Publication Data

US 2022/0180557 A1 Jun. 9, 2022

(51) Int. Cl.
*G06T 7/73* (2017.01)
*G06V 20/56* (2022.01)

(52) U.S. Cl.
CPC ............... *G06T 7/74* (2017.01); *G06V 20/56* (2022.01); *G06T 2207/20076* (2013.01); *G06T 2207/20081* (2013.01); *G06T 2207/30252* (2013.01)

(58) Field of Classification Search
CPC .. G06T 7/74; G06T 7/277; G06T 7/75; G06T 2207/20076; G06T 2207/20081; G06T 2207/30252; G06T 2207/10016; G06T 2207/10024; G06T 2207/20061; G06V 20/56; G06V 20/00; G06V 10/255; G06V 10/44; G06V 10/443
See application file for complete search history.

(56) References Cited

U.S. PATENT DOCUMENTS

| | | | | |
|---|---|---|---|---|
| 10,332,002 | B2 * | 6/2019 | Bliss | G06N 3/08 |
| 10,532,698 | B2 * | 1/2020 | Potnis | B60D 1/62 |
| 11,030,476 | B2 * | 6/2021 | Xu | B60R 1/00 |
| 2018/0081370 | A1 | 3/2018 | Miller | |
| 2018/0215382 | A1 * | 8/2018 | Gupta | G08G 1/166 |
| 2019/0265723 | A1 | 8/2019 | Kotteri et al. | |
| 2019/0332897 | A1 * | 10/2019 | Chen | G06V 10/454 |
| 2019/0335100 | A1 | 10/2019 | Chen et al. | |
| 2019/0337343 | A1 * | 11/2019 | Ramirez Llanos | B60D 1/36 |
| 2019/0339704 | A1 * | 11/2019 | Yu | G06T 7/174 |
| 2020/0023696 | A1 * | 1/2020 | Ling | B60R 1/003 |
| 2020/0039517 | A1 * | 2/2020 | Berkemeier | G05D 1/0231 |
| 2020/0079165 | A1 | 3/2020 | Niewiadomski et al. | |
| 2020/0175311 | A1 * | 6/2020 | Xu | B60R 1/00 |
| 2020/0276934 | A1 * | 9/2020 | Hüger | B60D 1/06 |

(Continued)

OTHER PUBLICATIONS

European Search Report dated May 16, 2022 for the counterpart European Patent Application No. 20210355.0.

*Primary Examiner* — Ian L Lemieux

(57) ABSTRACT

A method for determining a position of a tow ball in an image. The method includes obtaining at least one real-time image from a vehicle. The at least one real-time image is processed with a controller on the vehicle to obtain a feature patch (f) describing at least one real-time image. A convolution is performed of the feature patch (f) and each filter (h) from a set of filters (H) with the filter (h) being based on data representative of known tow hitches fixed to the vehicle. A location of a tow ball on the tow hitch is identified in the at least one real-time image is based on the convolution between the feature patch (f) and each filter (h) from the set of filters (H).

18 Claims, 3 Drawing Sheets

(56) References Cited

U.S. PATENT DOCUMENTS

| | | | |
|---|---|---|---|
| 2020/0282910 A1* | 9/2020 | Nagasamy | G06N 3/0454 |
| 2020/0353832 A1* | 11/2020 | Xiao | G06N 3/0445 |
| 2021/0034903 A1* | 2/2021 | Daga | G06V 10/764 |
| 2021/0103745 A1* | 4/2021 | Chakravarty | H04N 13/111 |
| 2022/0024391 A1* | 1/2022 | Gali | G06T 7/73 |
| 2022/0084212 A1* | 3/2022 | Dahal | G06V 20/56 |
| 2022/0092356 A1* | 3/2022 | Nagasamy | G06K 9/6262 |
| 2022/0147742 A1* | 5/2022 | El-sawah | G06V 10/454 |

\* cited by examiner

METHOD FOR REAL-TIME TOW BALL DETECTION

BACKGROUND

The present disclosure relates to trailer hitch assist systems. Trailer hitch assist systems are designed to support a driver in coupling a trailer to a vehicle. A tow hitch is a point on the vehicle at which the trailer pivots around as it moves. The tow hitch includes a tow ball, or other form of attachment, that is generally attached to a receiver on a rear of the vehicle.

Trailer hitch assist systems require information about an orientation and a position of the tow hitch mounted on the vehicle. Trailer hitch assist systems may also need information about a position of the tow hitch in relation to a position of a camera on the vehicle.

The tow hitch positions may be measured manually, but this approach can lead to inaccuracies, is costly, and time consuming. This is especially true when the tow coupling is not mounted during the manufacturing of the vehicle or in cases where the tow coupling can be moved manually or electronically on the vehicle. There is a desire to improve the accuracy and simplicity of determining a position of the tow hitch in relation to the vehicle.

SUMMARY

In one exemplary embodiment, a method for determining a position of a tow ball in an image. The method includes obtaining at least one real-time image from a vehicle. The at least one real-time image is processed with a controller on the vehicle to obtain a feature patch (f) describing at least one real-time image. A convolution is performed of the feature patch (f) and each filter (h) from a set of filters (H) with the filter (h) being based on data representative of known tow hitches fixed to the vehicle. A location of a tow ball on the tow hitch is identified in the at least one real-time image is based on the convolution between the feature patch (f) and each filter (h) from the set of filters (H).

In a further embodiment of any of the above, the set of filters (H) is stored in memory of the controller on the vehicle.

In a further embodiment of any of the above, the set of filters (H) includes an optimization of at least one image of multiple known tow hitches fixed to the vehicle.

In a further embodiment of any of the above, the set of filters (H) is performed by a computing device having a greater computing power than a computing power of the controller on the vehicle.

In a further embodiment of any of the above, the at least one real time image includes consecutive real-time images. Reducing a search area of the consecutive real-time images includes comparing the consecutive real-time images to identify areas with objects that did not move between the consecutive images and searching the areas with objects that did not move.

In a further embodiment of any of the above, the convolution is only performed on the area that did not move.

In a further embodiment of any of the above, the at least one real-time image is captured by a camera on a rear of the vehicle.

In a further embodiment of any of the above, a location of the tow ball identified on a display by a user is received.

In a further embodiment of any of the above, the set of filters (H) is developed based on an algorithm evaluating extracted features from a database of rear-view images of the vehicle.

In a further embodiment of any of the above, the extracted features include at least one of a histogram of oriented gradients ("HOG"), Color Names, RGB, or grayscale.

In a further embodiment of any of the above, the set of filters (H) is developed based on an algorithm that identifies learned features from a database of rear-view images of the vehicle.

In a further embodiment of any of the above, identifying the location of the tow ball includes utilizing an algorithm on the controller that identifies a location of highest probability of the location of the tow ball through a voting process.

In a further embodiment of any of the above, the voting process identifies at least one pixel in the real-time image from the vehicle with the greatest correlation to the location of the tow ball from the set of filters (H).

In a further embodiment of any of the above, the at least one real time image includes consecutive real-time images. Reducing a search area of the consecutive real-time images includes comparing the consecutive real-time images to identify areas with objects that did not move between the consecutive images and searching the areas with objects that did not move.

In another exemplary embodiment, a tow ball identification assembly includes a camera for capturing images of a tow ball. A controller is configured to obtain at least one real-time image from a vehicle and processing the at least one real-time image with a controller on the vehicle to obtain a feature patch (f) describing the at least one real-time image. A convolution is performed of the feature patch (f) and a set of filters (H) with the filter (h) being based on data representative of known tow hitches fixed relative to the vehicle. A location of a tow ball on the tow hitch is identified in the at least one real-time image is based on the convolution between the feature patch (I) and each filter (h) from the set of filters (H).

In a further embodiment of any of the above, the set of filters (H) is stored in memory of the controller on the vehicle. The set of filters (H) includes an optimization of multiple images of known tow hitches fixed to the vehicle and performing the convolution between the feature patch (f) with each filter (h) from the set of filters (H), which produces a probability of the tow ball position in the image.

In a further embodiment of any of the above, the set of filters (H) is developed based on an algorithm evaluating extracted features from a database of rear-view images of the vehicle In a further embodiment of any of the above, the extracted features include at least one of a histogram of oriented gradients ("HOG"), Color Names, RGB, or grayscale.

In a further embodiment of any of the above, the set of filters (H) is developed based on an algorithm that identifies learned features from a database of rear-view images of the vehicle.

In a further embodiment of any of the above, the at least one real time image includes consecutive real-time images. Reducing a search area of the consecutive real-time images includes comparing the consecutive real-time images to identify areas with objects that did not move between the consecutive images and searching the areas with objects that did not move.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
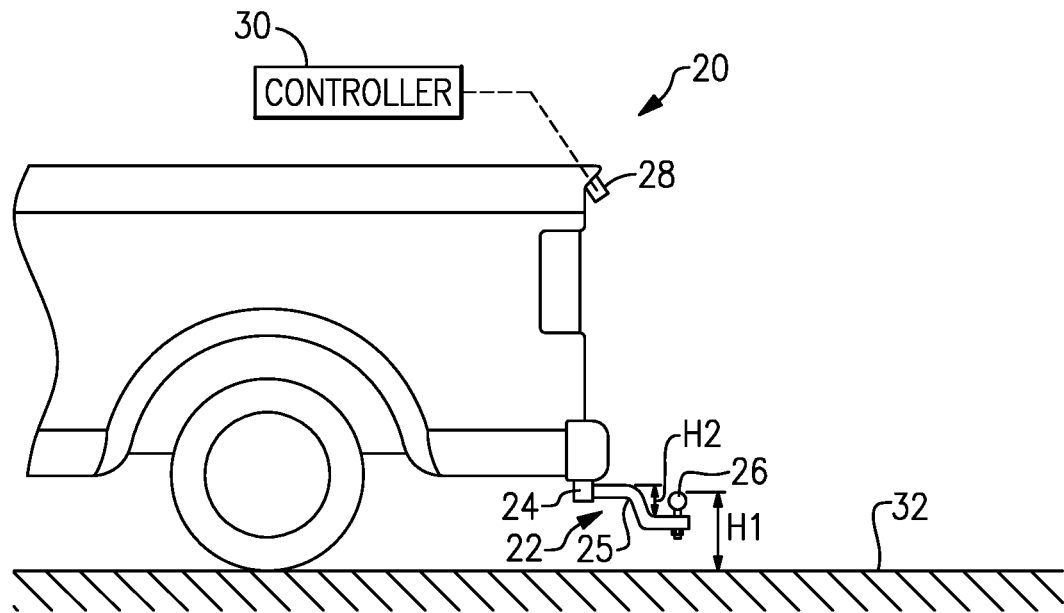
FIG. 1 illustrates an example vehicle having a receiver for accepting a tow hitch.

It is common today for vehicles 20 to include a tow hitch 22 that is fixed relative to the vehicle 20 by a receiver 24. In the illustrated example shown in FIG. 1, the tow hitch 22 includes a ball mount 25 for supporting a ball 26 adjacent a first end and attaching to the receiver 24 adjacent a second end. The ball mount 25 is removeable attached to the receiver 24 and not be retained by a pin. The ball 26 on the tow hitch 22 is used to form a connection with a trailer (not shown) to allow the trailer to rotate around the ball 26 while maneuvering the vehicle 20, particularly when turning or reversing the vehicle 20 when attached to the trailer.

Figure 2:
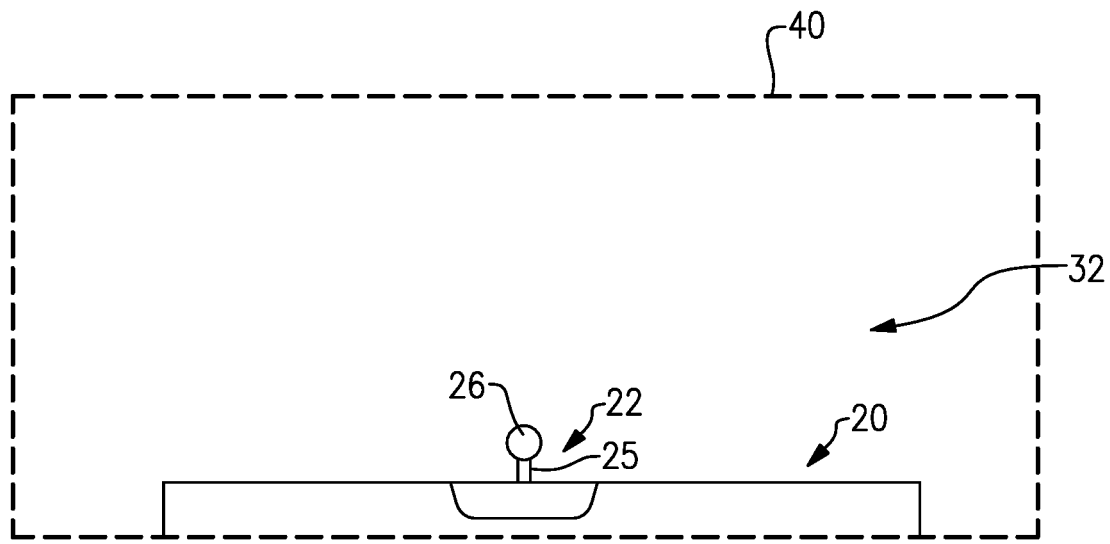
FIG. 2 illustrates an example image of the tow hitch taken by a camera on the vehicle of FIG. 1.

The vehicle 20 also includes a camera 28 for obtaining real-time images 40 (See FIG. 2) of the rear of the vehicle 20 including the tow hitch 22. The images can be projected on a display to users for assisting in viewing a rear of the vehicle 20 and a surrounding area. A controller 30 is located on the vehicle 20 and is in electrical communication with the camera 28 to capture, store, and/or process images from the point of view of the camera 28. The controller 30 includes a processor in electrical communication with memory for performing these steps and the ones outlined further below. The controller 30 can also include further inputs and outputs to for communicating with other parts of the vehicle 20.

In the illustrated example, the vehicle 20 is located on a flat ground segment 32, such that a top of the ball 26 is located a height H1 above the ground segment 32. The tow hitch 22 also includes a drop in the ball mount 25. The drop is defined by a height H2 between un upper surface of the ball mount 25 adjacent the receiver and an upper surface of the ball mount 25 adjacent the ball 26. The drop of the tow hitch 22 contributes to the change in height H1 of the ball 26 above the ground segment 32. While the illustrated example shows the drop H1 positioning the ball 26 closer to the ground segment 32 relative to the receiver 24, there may be applications where the drop H1 positions the ball 26 further away from the ground segment 32 to accommodate different trailer attachment heights.

Figure 3:
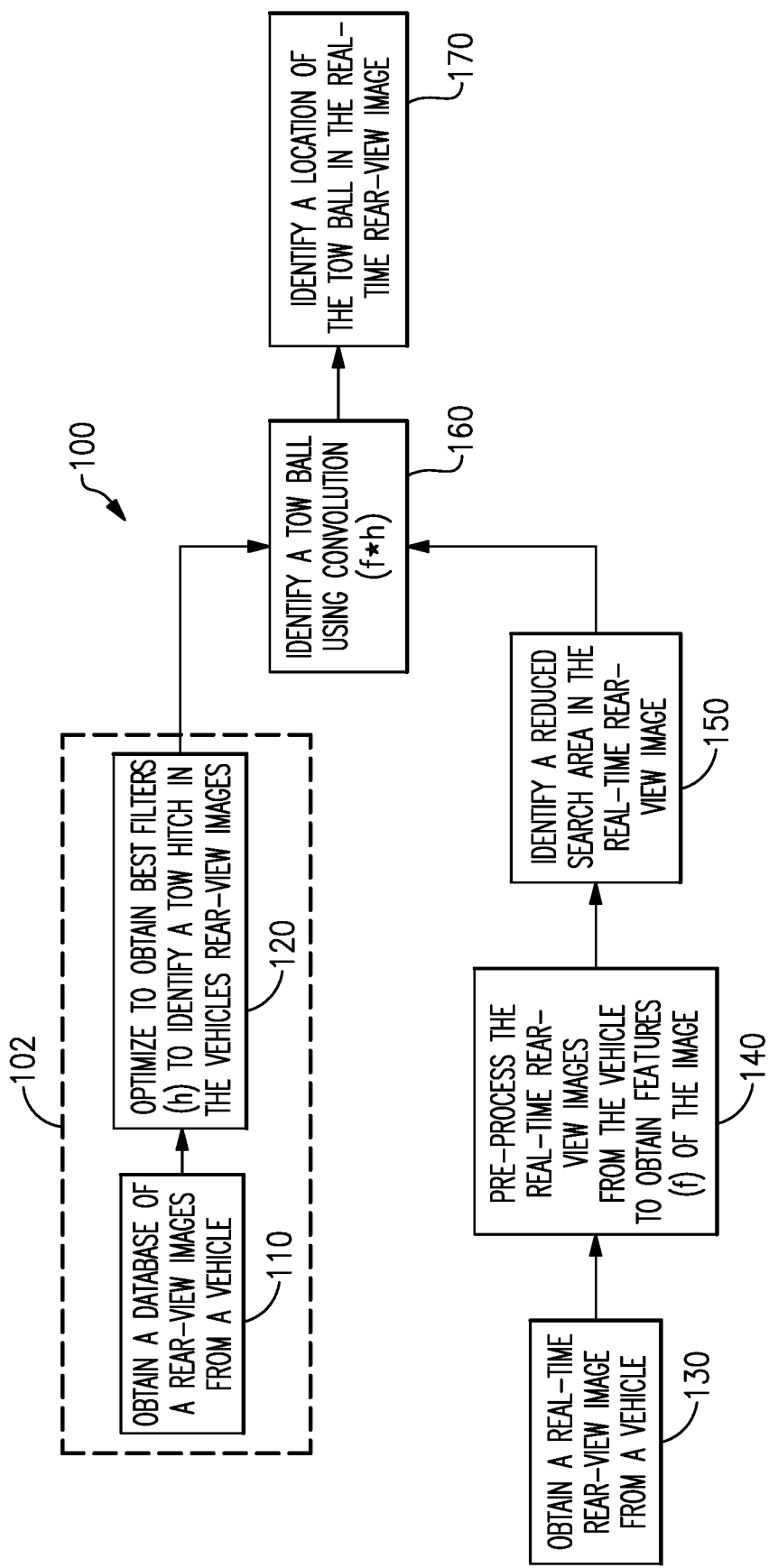
FIG. 3 illustrates a method of determining a position of a tow ball in an image.
Figure 5:
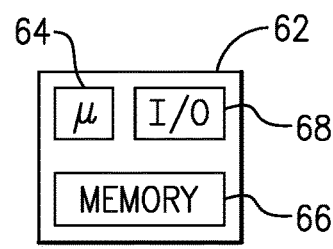
FIG. 5 illustrates an example computing device.
Figure 6:
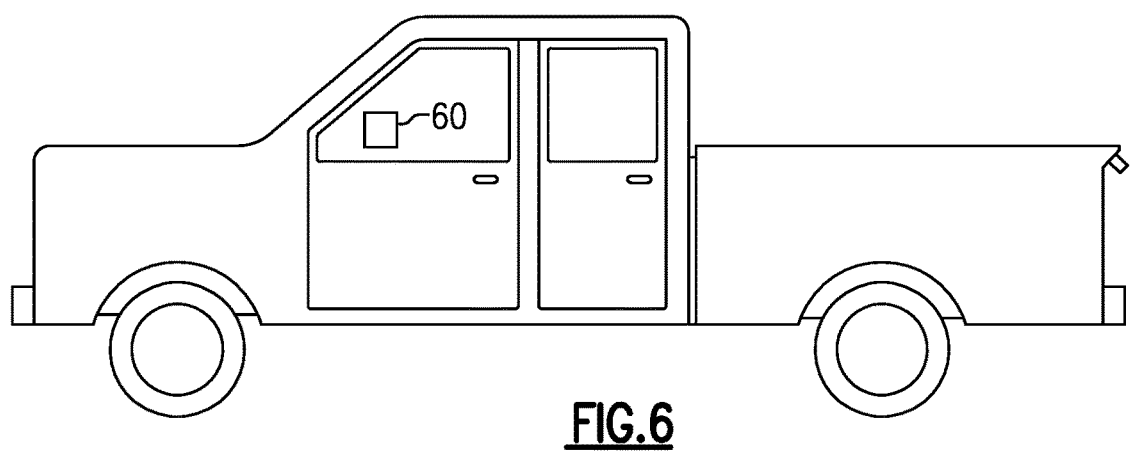
FIG. 6 illustrates a schematic view of the vehicle from FIG. 1.

FIG. 3 illustrates an example method 100 for determining a position of the tow ball 26 in the image 40 in real time. A portion 102 of the method 100 is performed offline or remote from the vehicle 20 and stored in memory on the controller 30 for use by the controller 30 to determine the location of the tow ball 26 in real time. In the example method 100, the portion 102 is performed on a higher-powered computing device 62, while the controller 30 performs the remaining steps with a microprocessor onboard the controller 30. The controller 30 differs from the computing device 62 in that the controller 30 does not possess as high of a level of computing power as the computing device 62. For example, the onboard controller may be a single Central Processing Unit (CPU) and does not need to any hardware accelerators such as a Vision Processing Unit (VPU), or a Graphics Processing Unit (GPU). As shown in FIG. 5, the computing device 62 includes memory 66 for storing data, a microprocessor 64, and an input/output 68.

The portion 102 requires the higher-powered computing device 62 to perform the steps 110 and 120 because the controller 30 is not capable of performing the steps 110 and 120 on a real-time basis that would be helpful to a user of the vehicle 20. However, as will be described in greater detail below, the controller 30 is nevertheless able to identify the location of the tow ball 26 in the real-time images 40 because the controller 30 can access the data calculated by the higher-powered computing device 62 stored in the memory of the controller 30.

Figure 4:
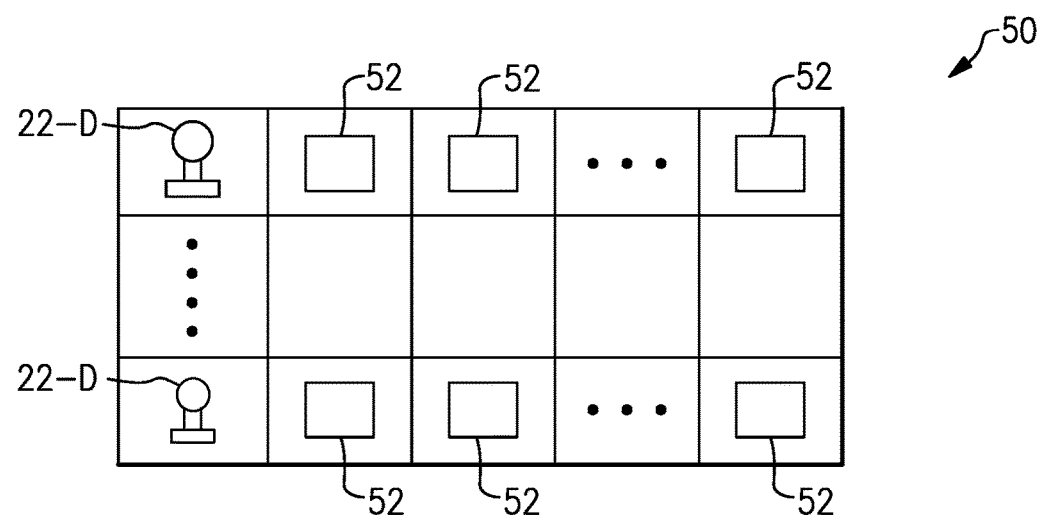
FIG. 4 illustrates an example database of tow hitches.

To perform the portion 102 of the method 100, the high-powered computing device 62 obtains access to a database 50 (FIG. 4) of rear-view images 52. The database 50 includes images from the rear-view camera 28 of the vehicle 20 with known tow hitches 22-D (step 110). The information included in the database 50 about the known tow hitches 22-D can include the position (in pixels) on the image 52, drop, ball diameter, and distance of the tow ball 26 from the receiver 24. Additionally, for each known tow hitch 22-D, the database 50 may include a single rear-view image 52 or a series of sequential rear-view images 52 that assist in identifying elements that are fixed locations between images 52.

For each image in the rear-view images 52 from the database 50, the computing device 62 performs an optimization to obtain the best filter (h) to identify the tow ball 26 in the rear-view image 40 of the vehicle 20 (step 120). The domain of the filter (h) is given in pixels, whose size, width and height, is given by the size of the training region. When different filters (h) are grouped together, it is referred as a set of filters (H). The optimization is performed through an algorithm. In one example, the algorithm extracts a feature patch (f), such as a histogram of oriented gradients ("HOG"), Color Names, RGB, and/or grayscale, for each image 52 in the database 50 to characterize the known tow hitches 22-D. The algorithm performs the optimization by looking at the extracted feature patch (f) in a training region of the image 52 and the given tow ball location information (ground truth) stored in the database 50. The training region of the image 52 includes a given height and width in pixels. The algorithm outputs the learned filter (h) for each rear-view images 52 from the database 50.

In another example of (step 120), the computing device 62 can use another algorithm to identify its own learned features (f) to optimize and obtain the best filter (h) from the rear-view images 52. The algorithm under this example will identify the learned features (f) by examining different scenarios displaying the tow ball 26 in the images 52 instead of looking at the specific extracted features identified above in the other example algorithm. Given an initial condition of the extracted features (f), the algorithm gets the filter (h) (as shown in the previous example). Next, the algorithm fixes the filter (h) found in the previous step to optimize and obtain a new feature patch (f). This process is repeated until the change on the feature patch (f) and/or the filter (h) is under a predetermined threshold or a maximum number of iterations is achieved. In this example, note that step 140 must use its own learned features (f).

At step 130, the controller 30 receives the image 40 in real time from the camera 28 of a rear-view of the vehicle 20. Once the controller 30 has received at least one real-time image 40 from the rear-view camera 28, the controller 30 can pre-process the image 40 to extract features (I) describing the image 40 (step 140). Some examples of a feature patch (f) may be a histogram of oriented gradients ("HOG"), Color Names, RGB, and/or grayscale The image 40 can be divided into patches or small segments for the controller 30 to identify the most relevant patches or segments to search in the image 40 (step 150). The controller 30 may identify the most relevant patches to search by identifying objects that did not move between consecutive rear-view images 40 from the camera 28. Identifying areas where objects did not move between consecutive areas helps to reduce the search area to identify the location of the tow ball 26 because the tow ball 26 does not move between consecutive images relative to the camera 28 while the surrounding environment will if the vehicle 20 is moving.

The controller 30 then performs a 2D convolution between the extracted feature patch (f) (from step 140) and for each filter (h) (from step 120). The last process is done for each image in the database 50 and each patch the controller 30 generated from the rear-view image 40 (step 160). A 1D convolution is a mathematical operation on two functions (f and h) that produces a third function (f*h) that expresses how the shape of one is modified by the other. The term convolution refers to both the result function and to the process of computing it. It is defined as the integral of the product of the two functions after one is reversed and shifted. And the integral is evaluated for all values of shift, producing the convolution function. A 2D convolution is just an extension of 1D convolution by convolving both horizontal and vertical directions in 2-dimensional spatial domain.

The controller 30 utilizes an algorithm with a voting process that identifies the position of high probability corresponding to the location of the tow ball 26 in the rear-view image 40. The voting process identifies a region of pixels or a single pixel in the image 40 with the greatest correlation to the location of the tow ball using each filter (h) learned in step 120. One advantage of performing the convolution to each patch, is that the algorithm can be run in real time on the controller 30 without the need for a high-end processor, like with the computing device 62.

The method 100 may also incorporate a calibration process to aid in selecting the correct position of the tow ball 26. In the calibration process, a user may select a position of the tow ball on a display 60 (FIG. 4) projecting the rear-view image 40. The display 60 may be a touch screen display to allow the user to select the location of the tow ball 26 through touching the portion of the display 60 showing the tow ball 26. The controller 30 can then perform the steps above to verify the location of the tow ball 26.

Once the controller 30 has identified the location of the tow ball 26 by performing the steps of the method 100 above, the location of the tow ball 26 can be presented on the display 60 or used by the controller 30.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method for determining a position of a tow ball in an image, the method comprising:
   obtaining at least one real-time image from a vehicle;
   for each real-time image of the at least one real-time image, processing the real-time image with a controller on the vehicle to obtain a feature patch (f) describing the real time image, the feature patch (f) including at least one of a histogram of oriented gradients ("HOG"), Color Names, RGB, or grayscale;
   performing a convolution of the feature patch (f) of each real-time image and each filter (h) from a set of filters (H) with each filter (h) being based on data representative of a known tow hitch fixed to the vehicle; and
   identifying a location of a tow ball on the tow hitch in each real-time image of the at least one real-time image based on the convolution between the feature patch (f) of the real-time image and each filter (h) from the set of filters (H),
   wherein the set of filters (H) is developed based on an algorithm evaluating extracted features from a database of rear-view images of the vehicle, wherein the extracted features include at least one of HOG, Color Names, RGB, or grayscale.

2. The method of claim 1, wherein the set of filters (H) is stored in memory of the controller on the vehicle.

3. The method of claim 2, wherein the set of filters (H) includes an optimization of at least one image of multiple known tow hitches fixed to the vehicle.

4. The method of claim 2, wherein the set of filters (H) is performed by a computing device having a greater computing power than a computing power of the controller on the vehicle.

5. The method of claim 2, wherein the at least one real time image includes consecutive real-time images and the method further comprises reducing a search area of the consecutive real-time images by comparing the consecutive real-time images to identify areas with objects that did not move between the consecutive images and searching the areas with objects that did not move.

6. The method of claim 5, wherein the convolution is only performed on the areas with objects that did not move.

7. The method of claim 1, wherein the at least one real-time image is captured by a camera on a rear of the vehicle.

8. The method of claim 1, including receiving a location of the tow ball identified on a display by a user.

9. The method of claim 1, wherein the set of filters (H) is developed based on an algorithm that identifies learned features from a database of rear-view images of the vehicle.

10. The method of claim 1, wherein identifying the location of the tow ball includes utilizing an algorithm on the controller that identifies a location of highest probability of the location of the tow ball through a voting process.

11. The method of claim 10, wherein the voting process identifies at least one pixel in the real-time image from the vehicle with the greatest correlation to the location of the tow ball from the set of filters (H).

12. The method of claim 1, wherein the at least one real time image includes consecutive real-time images and the method further comprises reducing a search area of the consecutive real-time images by comparing the consecutive real-time images to identify areas with objects that did not move between the consecutive images and searching the areas with objects that did not move.

13. The method of claim 1, wherein the feature patch (f) includes at least one of Color Names, RGB, or grayscale and wherein the extracted features include at least one of Color Names, RGB, or grayscale.

14. A tow ball identification assembly comprising:
a camera for capturing images of a tow ball; and
a controller configured to perform:
obtaining at least one real-time image from a vehicle;
for each real-time image, processing the real-time image with a controller on the vehicle to obtain a feature patch (f) describing the real-time image, the feature patch (f) including at least one of a histogram of oriented gradients ("HOG"), Color Names, RGB, or grayscale;
for each real-time image, performing a convolution of the feature patch (f) and each filter from a set of filters (H) with each filter (h) being based on data representative of a known tow hitch fixed relative to the vehicle; and
identifying a location of a tow ball on the tow hitch in each real-time image of the at least one real-time image based on the convolution between the feature patch (f) of each real-time image and each filter (h) from the set of filters (H), wherein the set of filters (H) is developed based on an algorithm evaluating extracted features from a database of rear-view images of the vehicle, the extracted features include at least one of HOG, Color Names, RGB, or grayscale.

15. The assembly of claim 14, wherein the set of filters (H) is stored in memory of the controller on the vehicle and the set of filters (H) includes an optimization of multiple images of known tow hitches fixed to the vehicle and performing the convolution between the feature patch (f) with each filter (h) from the set of filters (H), which produces a probability of the tow ball position in the image.

16. The assembly of claim 15, wherein the at least one real time image includes consecutive real-time images and the controller is further configured to reduce a search area of the consecutive real-time images by comparing the consecutive real-time images to identify areas with objects that did not move between the consecutive images and searching the areas with objects that did not move.

17. The assembly of claim 14, wherein the set of filters (H) is developed based on an algorithm that identifies learned features from a database of rear-view images of the vehicle.

18. The assembly of claim 14, wherein the feature patch (f) includes at least one of Color Names, RGB, or grayscale and wherein the extracted features include at least one of Color Names, RGB, or grayscale.

* * * * *